United States Patent
Steiner

(10) Patent No.: US 10,592,217 B2
(45) Date of Patent: Mar. 17, 2020

(54) SHARING DYNAMIC VARIABLES IN A HIGH AVAILABILITY ENVIRONMENT

(71) Applicant: Avaya Inc., Basking Ridge, NJ (US)

(72) Inventor: Robert C. Steiner, Broomfield, CO (US)

(73) Assignee: AVAYA INC., Basking Ridge, NJ (US)

(*) Notice: Subject to any disclaimer, the term of this patent is extended or adjusted under 35 U.S.C. 154(b) by 775 days.

(21) Appl. No.: 14/050,604

(22) Filed: Oct. 10, 2013

(65) Prior Publication Data
US 2015/0106798 A1 Apr. 16, 2015

(51) Int. Cl.
*G06F 8/41* (2018.01)
*G06F 11/14* (2006.01)

(52) U.S. Cl.
CPC ............ G06F 8/443 (2013.01); G06F 8/433 (2013.01); G06F 11/1451 (2013.01)

(58) Field of Classification Search
CPC ..... G06F 8/00–77; G06F 11/446–1494; G06F 11/1446–1451; G06F 8/433; G06F 8/443–4443
See application file for complete search history.

(56) References Cited

U.S. PATENT DOCUMENTS

| | | | | |
|---|---|---|---|---|
| 4,807,126 A * | 2/1989 | Gotou | ............... | G06F 8/443 717/160 |
| 6,708,331 B1 * | 3/2004 | Schwartz | ............... | G06F 8/452 717/160 |
| 7,596,570 B1 * | 9/2009 | Emigh | ............... | G06F 11/1453 |
| 8,127,095 B1 * | 2/2012 | Colgrove | ............... | G06F 11/1435 711/162 |
| 2008/0066072 A1 * | 3/2008 | Yurekli | ............... | G06Q 10/06 718/104 |
| 2010/0125835 A1 * | 5/2010 | Kandasamy | ............... | G06F 8/4441 717/151 |
| 2010/0165977 A1 * | 7/2010 | McCord | ............... | H04L 12/66 370/352 |
| 2010/0235218 A1 | 9/2010 | Erhart | | |
| 2010/0296417 A1 | 11/2010 | Steiner | | |
| 2011/0035752 A1 * | 2/2011 | Krishnakumar | ............... | G06F 9/4881 718/103 |
| 2011/0125793 A1 | 5/2011 | Erhart | | |
| 2011/0125826 A1 | 5/2011 | Erhart | | |

(Continued)

OTHER PUBLICATIONS

Riefert et al., Identification of critical variables using an FPGA-based fault injection framework, 2013 IEEE 31st VLSI Test Symposium (VTS), Berkeley, CA, 2013, pp. 1-6. (Year: 2013).*

(Continued)

*Primary Examiner* — Geoffrey R St Leger
*Assistant Examiner* — Joanne G Macasiano
(74) *Attorney, Agent, or Firm* — Sheridan Ross P.C.

(57) ABSTRACT

Methods and systems are provided that utilize compiler technology in identifying changed critical variables in work assignment code that cause synchronization issues between a master system and another server. The identified changed critical variables are shared by the master server in a high availability environment. In general, the sharing of changed critical variables includes sending, via a master system, changed code or critical variables to a receiving system. The receiving system can implement the changed code or critical variables to maintain synchronization with the master system.

20 Claims, 3 Drawing Sheets

(56) References Cited

U.S. PATENT DOCUMENTS

2011/0255683 A1  10/2011 Flockhart
2013/0279685 A1* 10/2013 Kohler ................ H04M 3/5175
                                                    379/265.02
2014/0281257 A1*  9/2014 Hochberg ............... G06F 3/065
                                                       711/135

OTHER PUBLICATIONS

Wang et al., Hadoop high availability through metadata replication, Proceedings of the first international workshop on Cloud data management, (CloudDB '09). ACM, New York, NY, USA, 37-44. (Year: 2009).*

* cited by examiner

SHARING DYNAMIC VARIABLES IN A HIGH AVAILABILITY ENVIRONMENT

FIELD OF THE DISCLOSURE

The present disclosure is generally directed toward communications and more specifically toward contact centers.

BACKGROUND

In general, a computer compiler is a program, or group of programs, configured to translate source code from a programming language into object/machine code. This object/machine code may then be used by a computer processor to execute instructions. In other words, it is one object of a compiler to create an executable program. Typical operations of a compiler can include performing syntax analysis, parsing, code generation, code optimization, and more.

Computer programming relies upon combinations of basic logic structures to solve problems. One of these basic logic structures is called a loop structure. Specifically, a loop is a sequence of instructions that may be continually repeated until a specific condition is met. An iteration is a single pass through the sequence of instructions that makes up a computer programming loop structure. By way of example, a loop may include the steps of retrieving data, changing it, and checking a condition based on the changed data. In the event that the condition is not met, the next instruction in the program sequence may instruct the program to repeat the steps, or iterate, until the condition is met. These iterations may continue until the program terminates automatically or the program is terminated (e.g., via the computer operating system, etc.) with an error.

The compiler may make use of match operations to determine if a string, or sequence of characters, matches a pattern. Each time a pattern successfully matches, it sets variables. In a contact center context, matching operations may be performed in an inner loop via a compiler. During match operations, the compiler can look at all of the data in the inner loop to determine which variables are changing as a result of executing the inner loop. Due in part to the large number of variables that may change as the inner loop is executed, identifying changed critical variables can be difficult and involved.

SUMMARY

It is with respect to the above issues and other problems that the embodiments presented herein were contemplated. In general, embodiments of the present disclosure provide methods, devices, and systems that utilize computer program compiler technology in identifying critical variables that can cause a high availability (HA) backup system to drift out of synchronization with a master system. A master system may then code critical variables and implement code to replicate the changed variables on the backup system. For example, the present disclosure provides flexibility in sending the critical variable changes to a backup server.

In one embodiment, the compiler understands the entire system. As such, the compiler is aware of inner loops and may observe what data is called in those inner loops. The compiler can trace data paths back to potential uses and determine if the variables change in any of the traced potential use cases. Changes may be sent to a backup server to keep the master server and backup server in synchronization. Additionally or alternatively, the embodiments disclosed herein may be employed to provide a warning when a variable is inappropriately used, for example, in an infinite loop.

Critical variables are those that exist in the inner loop. As can be appreciated, the inner loop may contain the most executed code. By analyzing critical variables in relation to their usage and even determining where they are modified, code may be rewritten at those code points by the compiler. The analysis and rewriting operations may create new code within the master system and allows the master system to send the changes to data to the remote backup. Examples of critical variables that change may include, but are in no way limited to, the count of eligible work (e.g., which may be limited to send after a match is made, etc.), assigned work on a resource, metrics (e.g., how long work was in queue, etc.), when a resource is added to the system, dictionaries (e.g., translating from an enterprise manager to internal identifications used by the matching engine), and more.

In some embodiments, the master system may be configured to identify variables that change multiple times during the execution of the inner loop. If a changing variable is identified as to be changed, then the code for the variable (where it will be changed) will optionally send the changed variable to the other system (e.g., from server A to server B). The master system may modify the code at the inner loop exit and send critical variable changes to the remote system. In one embodiment, sending critical variable changes may be performed once, for example, when the loop exits.

It is an aspect of the present disclosure that the mechanism to find variables may use data flow analysis. This data flow analysis may start at the inner loop. In some embodiments, the inner loop can be identified by a keyword sequencer in the contact center programming language (e.g., CCal, etc.) grammar. This keyword sequencer can be an attribute of a method in another language such as C#, an annotation in Java, etc. In another embodiment, a profiler may identify a "hot spot" to indicate the existence of an inner loop, and/or the equivalent of an inner loop. In one embodiment, all of the code executed in the inner-loop (sequencer), may then be evaluated for variable changes. As can be appreciated, the process may be recursive, for instance, a method in the sequencer may call another method that calls another, etc.

In some embodiments, there may be no "optimization" of new code sent to the backup system. Although there may be a slight performance penalty for the master system, the slight penalty may result in an overall cost savings. For instance, the master system no longer has to send blocks of changed memory. In some embodiments, the master system may be configured to send the absolute minimum information in a compressed form to the backup server. This information may be sent in blocks during, or at the end of, a match. For example, if a variable changes every time work is counted, it may be beneficial not to send every change. In this case, just the final change, or the one made at the end of the match, as determined by the compiler may be sent to the backup server.

By way of example, it may not be efficient to send all data changes all the time. For instance, if an algorithm continually changing data (e.g., decrements the counter), then the system would be send data each time the data (count) changes. In this example, it may be more efficient if the data is sent when the algorithm completes the loop. The compiler knows when the loop completes, and can send the changes at that time. As can be appreciated compiler has an execution awareness rather than a memory-based awareness. In another embodiment, the master system can also provide a warning that a variable is inappropriately used in a loop. In this case, the compiler can detect loops that need to be fixed.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
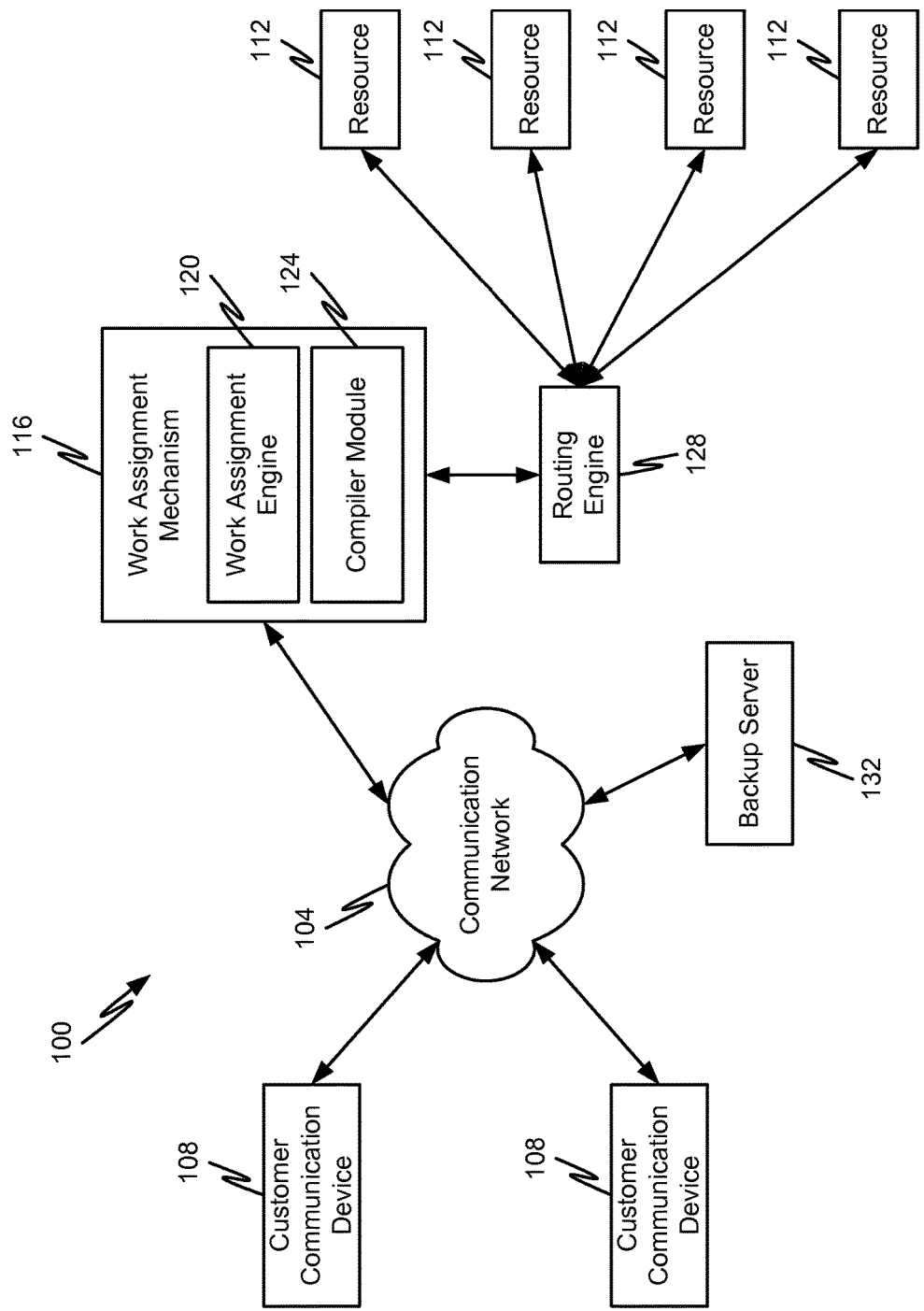
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource associated with at least one resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively, each of which are hereby incorporated herein by reference in their entirety for all that they teach and for all purposes.

The format of the work item may depend upon the capabilities of the communication device 108 and the format of the communication. In some embodiments, work items are logical representations within a contact center of work to be performed in connection with servicing a communication received at the contact center (and more specifically the work assignment mechanism 116).

Although the routing engine 128 is depicted as being separate from the work assignment mechanism 116, the routing engine 128 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources of a resource 112. The type of medium used by the communication device 108 to communicate with other communication devices 108 or processing resources may depend upon the communication applications available on the communication device 108.

In accordance with at least some embodiments of the present disclosure, the work item is sent toward a collection of processing resources 112 associated with a contact center via the combined efforts of the work assignment mechanism 116 and routing engine 128. The resources can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers, and may include contact centers. As can be appreciated, once a work item is received by a contact center, the contact center site may apply subsequent work assignment operations to direct the work item to an appropriate resource.

As discussed above, the work assignment mechanism 116 and resources may be owned and operated by a common entity in a contact center format. In some embodiments, the work assignment mechanism 116 may be administered by multiple enterprises, each of which has their own dedicated resources connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can determine which of the plurality of processing resources and/or contact center sites is eligible and/or qualified to receive a work item and further determine which of the plurality of processing resources is best suited to handle the processing needs of the work item. In some embodiments, the work assignment engine 120 is configured to achieve true one-to-one matching.

The work assignment engine 120 may reside in the work assignment mechanism 116 or in a number of different servers, contact centers, or processing devices. In some embodiments, cloud-based computing architectures can be employed whereby one or more components of the work assignment mechanism 116 are made available in a cloud or network such that they can be shared resources among a plurality of different users.

In addition to comprising the work assignment engine 120, the work assignment mechanism 116 may also comprise a compiler module 124. In one embodiment, the compiler module 124 may be configured as processor executable instructions stored in memory. Additionally or alternatively, the compiler module 124 may be configured to at least perform the matching operations disclosed herein via one or more inner loops while compiling contact center code. In one embodiment, a contact center may need to compile operational programming code upon initializing. In some embodiments, a contact center may recompile its code from time to time to accommodate various changing conditions. In any event, the compiler module 124 may be responsible for compiling and/or recompiling the contact center programming code.

In some embodiments, the compiler module 124 may be configured to determine changing variables in an inner loop as well as determine whether the changing variables are critical. In one embodiment, the variables may be determined while the inner loop is executing. In some embodiments, the variables may be determined after at least one iteration of the inner loop has been performed. Among other things, the compiler module 124 may determine whether the changing variables could cause a synchronization error between a master server and at least one other server (e.g., backup server 132, slave server, etc.). It is anticipated that the work assignment mechanism 116 and/or the subcomponents that make up the work assignment mechanism 116 may be included in a master server, or master system.

In some embodiments, the compiler module 124 may determine changing variables in a contact center program's inner loop that may occur as a result of executing the loop. Additionally or alternatively, the compiler module 124 can determine whether the changing variables are critical. Critical variables may include, but are not limited to, a count of eligible work, assigned work on a resource, work assignment metrics, resource metrics, contact center metrics, when a resource is added to a system, dictionaries, and the like. As can be appreciated, the critical variables may relate to those variables that influence work assignments and contact center operations. For example, at least one critical variable can influence the efficient allocation of work items and/or resources in a contact center environment. As a contact center operates, and program code is executed, the compiler module 124 may determine that changes to certain variables (e.g., critical variables) require changes to be made to the code. In some embodiments, the changes in variables, especially critical variables, can be caused by changes to contact center resources, time, processing capabilities, contact center traffic, resource availability, and the like. As can be appreciated, making changes to the code can account for changing critical variables and result in an improvement of at least one of work assignments, resource usage, and contact center performance.

In one embodiment, the compiler module 124 may observe that critical variables are changing as a result of executing the inner loop of contact center code and determine to rewrite the code. By analyzing critical variables as to their usage and determining where they are modified, code may be rewritten at those code points by the compiler module 124. In some cases, the code may be rewritten within a master system, or server, where it may be subsequently distributed to a backup system or other servers.

Figure 2:
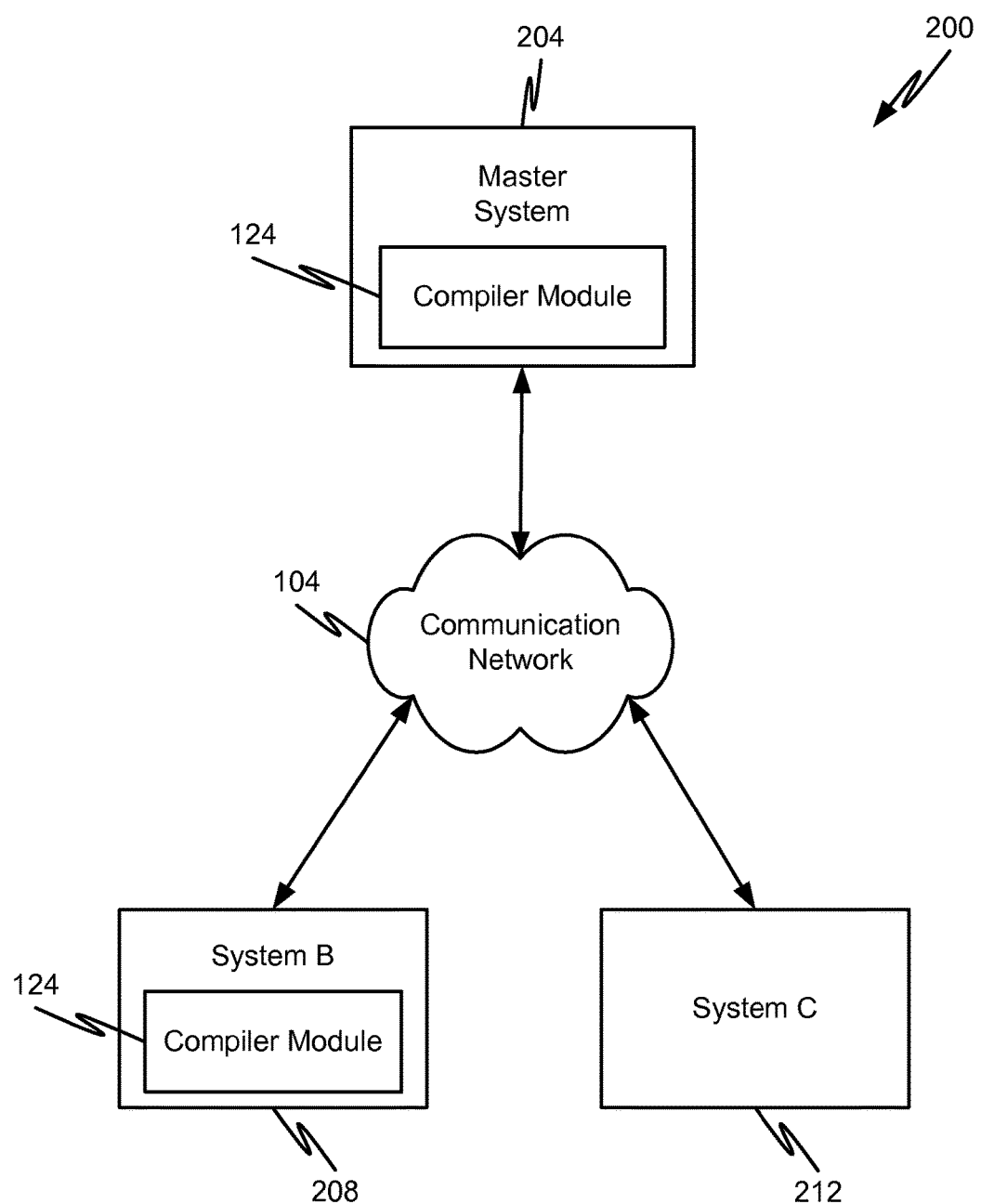
FIG. 2 is a block diagram depicting a master system in communication with other systems in accordance with embodiments of the present disclosure.

FIG. 2 depicts a block diagram of a master system 204 in communication with other systems 208, 212, in accordance with embodiments of the present disclosure. In general, a master system 204 may communicate via a communication network 104 to at least one other system 208, 212. Among other things, the master system 204 may include a compiler module 124 as disclosed herein. In some embodiments, the master system 204 can send any critical variable changes detected by the compiler module 124 to another system 208, 212. It is an aspect of the present disclosure that sending critical variable changes to other systems can allow all of the systems to remain in synchronization. In other words, each of the systems 204, 208, 212 in communication can at least use the same critical variables in executing the inner loop of each contact center program code.

In some embodiments, the compiler module 124 of the master system 204 may rewrite code based at least partially on the changes observed to critical variables in the inner loop. In accordance with aspects of the present disclosure, the code may include rewriting executable instructions used in the inner loop of the contact center program code. In any event, this rewritten, or changed, code may be sent by the master system 204 to another system 208, 212 or backup server 132. In some cases, the backup server 132 may be configured as System B 208 and/or System C 212.

The master system 204 may be configured to identify variables that change multiple times during the execution of the inner loop. Upon identifying a changing variable, the code for the variable can optionally send the changed variable to another system 208, 212. In some embodiments, the master system 204 may modify the code at the inner loop exit and send the critical variable changes to another system 208, 212 once when the loop exits.

In some embodiments, one or more of the other systems 208, 212 can include a compiler module 124. As can be appreciated, individual systems may determine that critical variables have changed for one or more systems and send the changes to one another. The critical variables may be shared via instructions stored in code. In one embodiment, the critical variables may be sent as blocks. Additionally or alternatively, the critical variables may be provided as a list (e.g., a call list, library, etc.). In any event, these critical values may be evaluated by a receiving system to determine whether the changing critical values need to be included at the receiving system. In some cases, the receiving system may reject critical values sent by another system. This rejection may be based on a comparison made by the receiving system. The comparison may include comparing the received critical variables to any critical variables used by the receiving system. Where it is determined that the received critical variables would improve the code at the receiving system, the received critical variables may be implement in the inner loop of the receiving system. Alternatively, where it is determined that the received critical variables would not improve the code at the receiving system, the received critical variables may be rejected by the receiving system. One example of a system that includes a compiler module is shown as System B 208 in FIG. 2.

System C 212 is depicted as a system that may not include a compiler module 124. In this case, System C 212 may refer to a backup server 132 which receives data from a master system 204. Additionally or alternatively, System C 212 may refer to a backup server 132 utilized in a high availability environment. The data transferred to System C 212 via the master system 204 may include changed critical variables. As previously disclosed, the critical variables may be sent/shared in blocks, as code, and/or provided as a list. The shared critical variables may be sent to System C 212 during or at the end of a match performed by the compiler module 124 of the master system 204. In one example, a variable may change every time work is counted via the master system 204. Continuing this example, the master system 204 may determine to send the final change (e.g., at the end of the match operation) as determined by the compiler module 124. By sending the changing critical variables after an inner loop has been executed, the master system 204 is not required to continually send data changes as iterations of the inner loop are performed. In this case, the execution awareness of the compiler module 124 of the master system 204 provides the efficient transfer of data between the master system 204 and System C 212 when the loop completes.

It is anticipated that the communication system 200 depicted in FIG. 2 may include two or more master systems. For example, in addition to master system 204, System B 208 may be a master system, and as such, may share critical variables between other systems in the communication system 200, namely one or more of the master system 204 and System C 212. In some cases, each master system 204, 208 may be associated with individual contact center sites that make up a contact center system. Critical variables from one or more of the master systems may be sent to and received by a remote server over the communication network. The critical variables received by the remote server may be compared to determine commonalities, differences, and even determine optimizations. It is an aspect of the present disclosure that optimized critical values may be distributed about the communication system 200 via the remote server to one or more of the systems 204, 208, 212.

Figure 3:
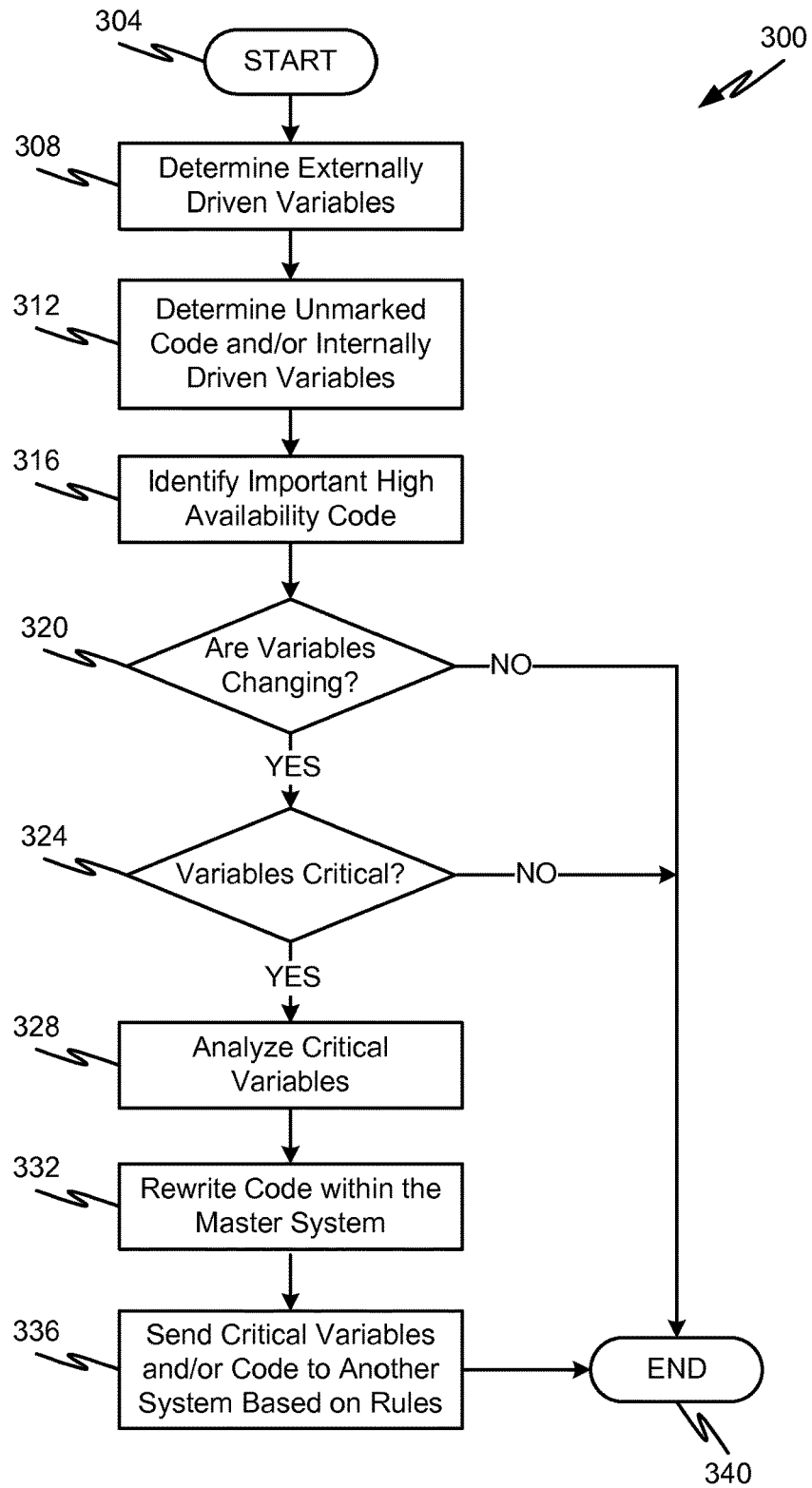
FIG. 3 is a flow diagram depicting a method of sharing dynamic variables in a high availability environment in accordance with embodiments of the present disclosure.

Referring now to FIG. 3, a flow diagram is provided in accordance with embodiments of the present disclosure depicting a method 300 of sharing dynamic variables in a high availability environment. The method 300 begins at step 304 and proceeds by determining externally driven variables (step 308). In some embodiments, the externally driven variables may include properties and fields. Determining the externally driven variables may be performed via the compiler module 124 by data flow analysis. In one embodiment, the data flow analysis may begin by analyzing public application programming interfaces (APIs). For example, any code that assigns a value in the execution flow may be considered to be externally driven. Each of the externally driven code blocks are marked as such.

Next, the method 300 continues by determining any unmarked code, or code blocks, and/or internally driven variables (step 312). In some cases, the internally driven variables may be determined via the compiler module 124 detecting variables that are not externally driven. For example, work assignments may be determined to be internally driven.

The method 300 continues by identifying important high availability code (step 316). In one embodiment, the compiler module 124 may determine attributes and/or annotations associated with assignments to identify important high availability code. For instance, code that data flows into loops has the potential of changing many variables. In this example, such code may be identified as important. It should be appreciated that internally driven variables and/or externally driven variables can qualify as important code. In some embodiments, data may be identified as loop based, or external/internal. Exceptions to data found via the processes outlined above may be flagged using annotations.

Once the important high availability code is determined, the method 300 continues by determining whether any of the variables are changing (step 320). If no variables are changing, the method 300 ends at step 340. All of the code executed in the inner loop, or sequencer, can be evaluated for variable changes. If variables are determined to be changing, the method 300 proceeds to step 324.

At step 324, the compiler module 124 determines whether the changing variables qualify as critical variables. If it is determined that the variables are not critical, the method 300 ends at step 340. Among other things, critical variables exist in the inner loop. Variables may be determined to be critical when the variables affect the allocation of work in a contact center at a given period of time. Typical changing critical variables can include resource availability, counts of eligible work, metrics, dictionaries, etc. In some embodiments, changing variables may be determined to be critical when, if the changed variable was not included in work assignments calculations, would result in inefficient work assignments. The efficiency of a work assignment may be evaluated by comparing a work assignment made by an unchanged variable to a work assignment made including the changed variable. In some cases, the work assignment that does not meet a predetermined level of contact center performance, resource utilization, and/or work item disposal would qualify as inefficient. A work assignment that meets or exceeds a predetermined level of contact center performance, resource utilization, and/or work item disposal would qualify as efficient. As can be appreciated, some cases may exist where the work assignment made (whether utilizing a changed or unchanged variable) may result in meeting or exceeding the predetermined level. In one embodiment, given the previous case, the variable may be considered as non-critical. In another embodiment, given the previous case, the level of a work assignment made with a changed variable may be compared to that of an unchanged variable to determine a magnitude of the difference. In some embodiments, the magnitude of the difference may determine whether or not the variable is critical.

Next, the method 300 continues by analyzing the critical variables (step 328). In some embodiments, the critical variables may be analyzed in relation to their usage and/or where they are modified. Additionally or alternatively, the critical variables may be analyzed to determine whether the critical variables change multiple times during the execution of the inner loop. As can be appreciated, efficiency in transferring data can be achieved by sending critical variables that change multiple times during a loop when all iterations of the loop are completed. In analyzing the critical variables, the compiler module 124 can determine which critical variables should be changed, and at which code points, the critical variables should be changed in the code.

The method 300 continues by the compiler module 124 rewriting code within the master system to include the changed critical variables (step 332). Rewriting the code may include writing new executable instructions associated with the inner loop and/or match operations performed by the compiler module 124. In one embodiment, rewriting the code may include creating one or more library, call list, and function, that includes at least some of the critical variables analyzed.

Once the code has been rewritten, the compiler module 124 and/or the master system may send the new code and/or the changed critical variables to another system (step 336). In some embodiments, the rewritten code may include the changed critical variables as part of the inner loop code. In accordance with embodiments of the present disclosure, this rewritten code may be sent to another system in communication with the master system. In one embodiment the code may be sent to another system based on the completion of a loop. For example, when a critical variable is determined to change during iterations of a loop, the rewritten code may be sent to another system in communication with the master system when the loop iterations have completed. In other cases, it may be determined that certain critical variables do not change with every iteration of an inner loop. In this case, the rewritten code incorporating these critical variables may be sent to another system after at least one iteration of the inner loop has executed, and where the critical variables have been determined to change. As provided herein, it is an aspect of the present disclosure that sending the rewritten code may be performed by the master system dynamically and based at least on loop execution awareness.

In some embodiments, the master system may send one or more call list, function, library, and/or critical variable to another system (step 336). In other words, a receiving system (i.e., a system that receives data sent from a master system) may receive the critical variables from the master system and subsequently incorporate at least one of the critical variables into the inner loop code used by the receiving system. Among other things, the critical variables may be sent and received as blocks that can be integrated with existing code without replacing all of the code at the receiving system.

In an illustrative example, a master system may send rewritten code and/or changed critical variables to backup server 132. As can be appreciated, the inner loop and matching operations performed by the master system and backup server 132 should be as close as possible to prevent inefficiencies in the event of a master system event (e.g., outage, maintenance, upgrade, repair, etc.). Accordingly, the master system may periodically send the critical variables and/or rewritten code to the backup server 132. This periodic sending of data can allow the backup server 132 to be maintained in operational synchronization with the master system. In other words, both the master system and the backup server 132 may utilize the same inner loop code.

In one embodiment, a master system may send changed critical variables and/or code to another master system. In other words, a sending master system may determine that critical variables have changed that should be shared with other (receiving) systems. A receiving system may determine to apply the shared changed critical variables and/or code or reject the received data, based at least partially on stored rules. The rules may be set by an administrator and/or be specific to a server/system (e.g., according to hardware identification, firmware revision, etc.).

In yet another embodiment, a master system may send changed critical variables and/or code to a remote server other than another master system. For example, the remote server may be configured to receive changed critical variables from one or more master system. In some cases, the remote server may compare differences in received changed critical variables. Additionally or alternatively, the remote server may distribute changed critical variables to one or more master systems, other systems, backup servers, and the like. These distributed changed critical variables may be optimized via the remote server. For instance, the distributed changed critical variables may provide optimal work assignments on a system-wide contact center basis. In any embodiment, the method 300 ends at step 340.

It should be appreciated that some or all of the concepts described herein may be utilized in a queue-based contact center or any other traditional contact center architecture.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    determining, by a processor, changing variables that change as an operation of a work assignment mechanism is executed in a contact center, wherein the work assignment mechanism determines results of work assignments within the contact center, and wherein the results comprise a first result that includes one of the changing variables and a second result that excludes the one of the changing variables;
    comparing, via the processor, the first result to the second result;
    determining, via the processor, that inclusion of the one of the changing variables in the work assignment mechanism meets or exceeds a predetermined setting to identify that the one of the changing variables is a critical variable used in the operation;
    determining, via the processor, a change in the critical variable as a result of continuing to execute iterations of the operation; and
    rewriting, via the processor, a code of the contact center to include the critical variable.

2. The method of claim 1, wherein the operation is an inner loop and, the method further comprises:
    detecting, via the processor, multiple changes to the critical variable determined to change over two or more iterations of the inner loop executed; and completing, via the processor and in response to detecting the multiple changes, execution of all iterations of the inner loop.

3. The method of claim 1, wherein the operation is an inner loop and the method further comprises:
 detecting, via the processor, that the critical variable determined to change remains unchanged for at least two iterations of the inner loop executed.

4. The method of claim 1, wherein the critical variable determined to change is sent to a synchronized backup server to maintain an operational synchronization between the contact center and the synchronized backup server.

5. The method of claim 1, wherein the critical variable determined to change is sent to a synchronized backup server as the rewritten code.

6. The method of claim 1, wherein the critical variable determined to change is sent to a synchronized backup server as at least one of a call function, library, and list.

7. The method of claim 1, wherein the critical variable determined to change includes at least one of a count of eligible work, work assigned to a resource, metrics, when a resource is added to the contact center, and dictionaries.

8. The method of claim 1, wherein the operation is an inner loop, wherein a synchronized backup server is a master system in a high availability environment, and wherein the method further comprises:
 sending, via the processor, the critical varbiel determined to change to the synchronized backup server across a communication network;
 receiving the critical variable determined to change; and
 determining, via the master system, whether to include the critical variable determined to change in a master system inner loop code.

9. The method of claim 8, wherein determining whether to include the critical variable determined to change further comprises:
 comparing, via the master system, the critical variable determined to change to at least one master system critical variable; and
 selecting, via the master system and based at least partially on rules, optimal critical variables to implement into the master system inner loop code.

10. A system, comprising:
 a processor; and
 a computer-readable storage medium having instructions stored thereon that, when executed by the processor, cause the processor to:
 determine changing variables that change as an operation of a work assignment mechanism is executed in a contact center, wherein the work assignment mechanism determines results of work assignments within the contact center, and wherein the results comprise a first result that includes one of the changing variables and a second result that excludes the one of the changing variables;
 compare the first result to the second result;
 determine that inclusion of the one of the changing variables in the work assignment mechanism meets or exceeds a predetermined setting to identify that the one of the changing variables is a critical variable used in the operation;
 determine a change in the critical variable as a result of continuing to execute iterations of the operation; and
 rewrite a code of the contact center to include the critical variable.

11. The system of claim 10, wherein the operation is an inner loop and the instructions, when executed by the processor, further cause the processor to:
 detect multiple changes to the critical variable determined to change for two or more iterations of the inner loop executed; and
 complete, in response to detecting the multiple changes, execution of all iterations of the inner loop.

12. The system of claim 10, wherein the operation is an inner loop and the instructions, when executed by the processor, further cause the processor to:
 detect the critical variable determined to change remains unchanged for at least two iterations of the inner loop executed.

13. The system of claim 10, wherein the critical variable determined to change is sent to a synchronized backup server to maintain an operational synchronization between the contact center and the synchronized backup server.

14. The system of claim 10, wherein the critical variable determined to change is sent to a synchronized backup server as the rewritten code.

15. The system of claim 10, wherein the critical variable determined to change is sent to a synchronized backup server as at least one of a call function, library, and list.

16. The system of claim 10, wherein the critical variable includes at least one of a count of eligible work, work assigned to a resource, metrics, when a resource is added to the contact center, and dictionaries.

17. The system of claim 10, wherein the operation is an inner loop, wherein a synchronized backup server is a master system in a high availability environment, and wherein the instructions, when executed by the processor, further cause the processor to:
 send the critical variable determined to change to the synchronized backup server across a communication network;
 receive the critical variable determined to change; and
 determine, via the master system, whether to include the critical variable determined to change in a master system inner loop code.

18. The system of claim 17, wherein causing the processor to determine whether to include the critical variable determined to change includes instructions that, when executed by the processor, cause the processor to:
 compare, via the master system, the critical variable determined to change to at least one master system critical variable; and
 select, via the master system and based at least partially on rules, optimal critical variables to implement into the master system inner loop code.

19. A contact center, comprising:
 a processor; and
 a computer-readable storage medium having instructions stored thereon that, when executed by the processor, cause the processor to:
 determine changing variables that change as an operation of a work assignment mechanism is executed in the contact center, wherein the work assignment mechanism determines results of work assignments within the contact center, and wherein the results comprise a first result that includes one of the changing variables and a second result that excludes the one of the changing variables;
 compare the first result to the second result;
 determine that inclusion of the one of the changing variables in the work assignment mechanism meets or exceeds a predetermined setting to identify that the one of the changing variables is a critical variable used in the operation;

determine a change in the critical variable as a result of continuing to execute additional iterations of the operation; and rewrite a portion of the operation of the contact center to include the critical variable.

20. The contact center of claim 19, wherein the operation is an inner loop, wherein a rewritten portion of the inner loop including the critical variable determined to change is sent as a block of code configured to be integrated with existing code on a synchronized remote backup server without replacing all existing code on the synchronized remote backup server.

* * * * *

UNITED STATES PATENT AND TRADEMARK OFFICE
CERTIFICATE OF CORRECTION

PATENT NO. : 10,592,217 B2
APPLICATION NO. : 14/050604
DATED : March 17, 2020
INVENTOR(S) : Robert C. Steiner Page 1 of 1

It is certified that error appears in the above-identified patent and that said Letters Patent is hereby corrected as shown below:

In the Specification

At Column 13, Line 27, please delete "varible" and insert --variable-- therein.

Signed and Sealed this
Eighth Day of September, 2020

Andrei Iancu
*Director of the United States Patent and Trademark Office*